Dec. 8, 1936.　　　　　E. F. MARTINET　　　　　2,063,692
FOOD PREPARER
Filed Oct. 6, 1933　　　　　4 Sheets—Sheet 1
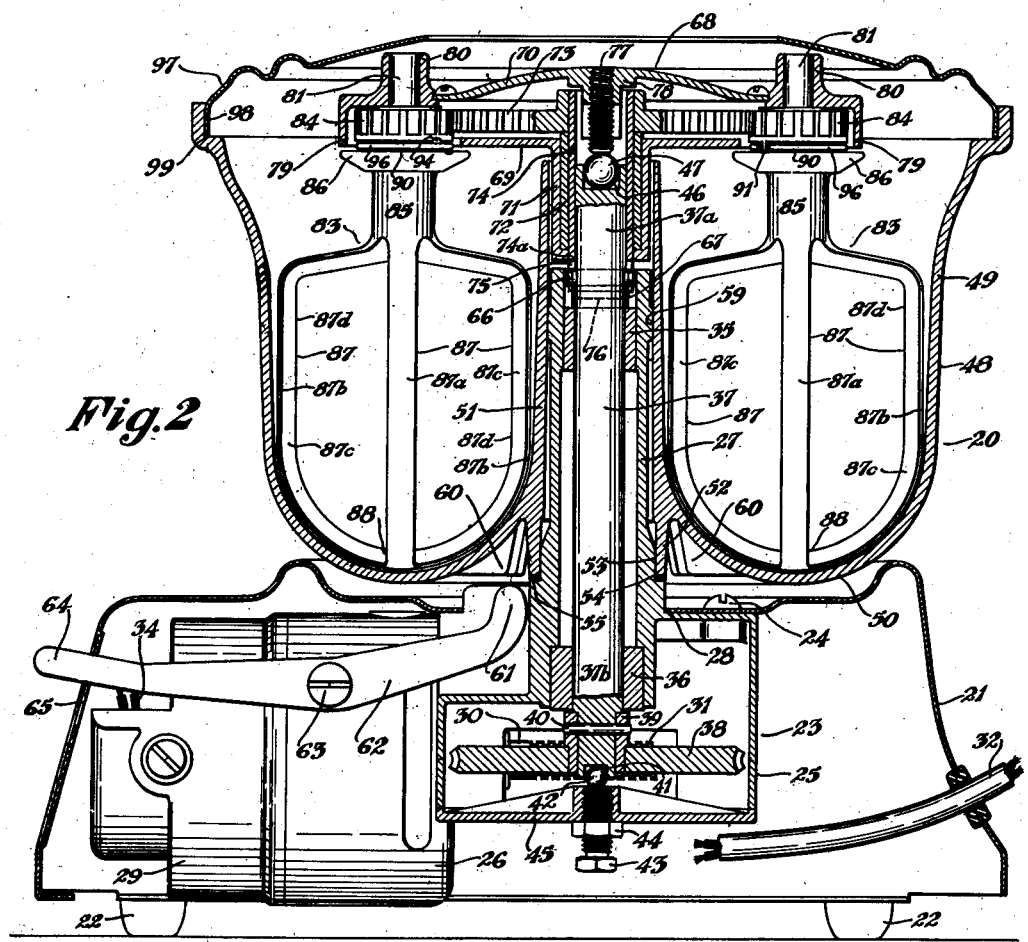
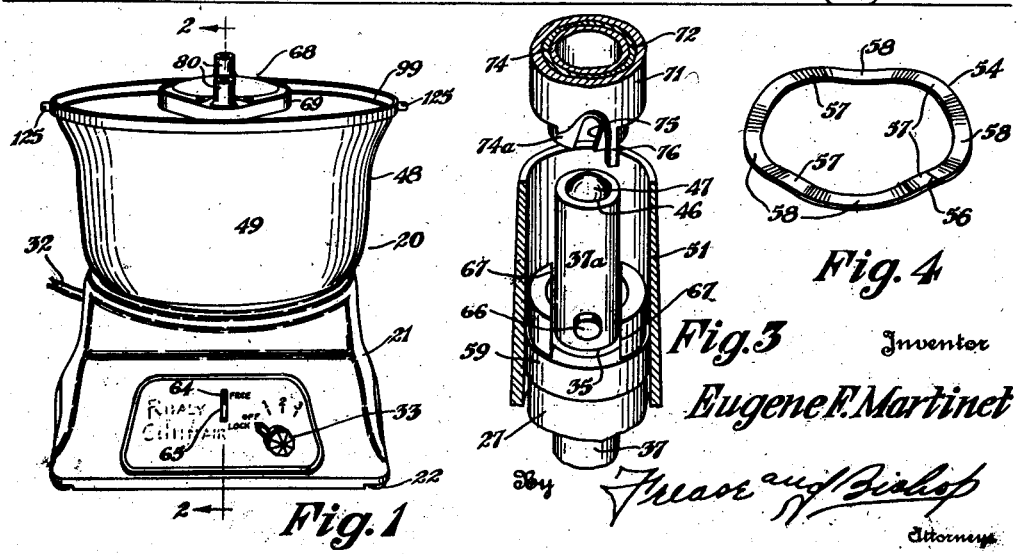
Inventor
Eugene F. Martinet Dec. 8, 1936.  E. F. MARTINET  2,063,692
FOOD PREPARER
Filed Oct. 6, 1933  4 Sheets-Sheet 2
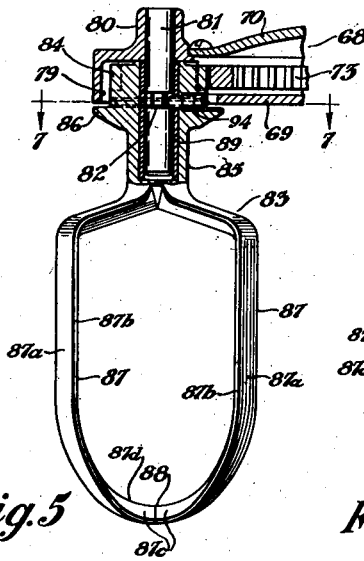
Fig. 5
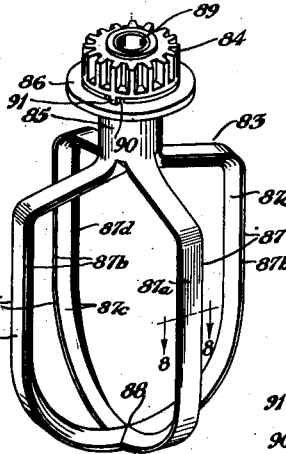
Fig. 6
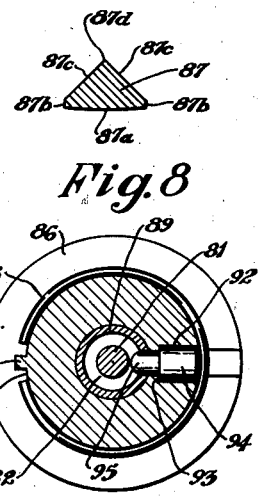
Fig. 8
Fig. 7
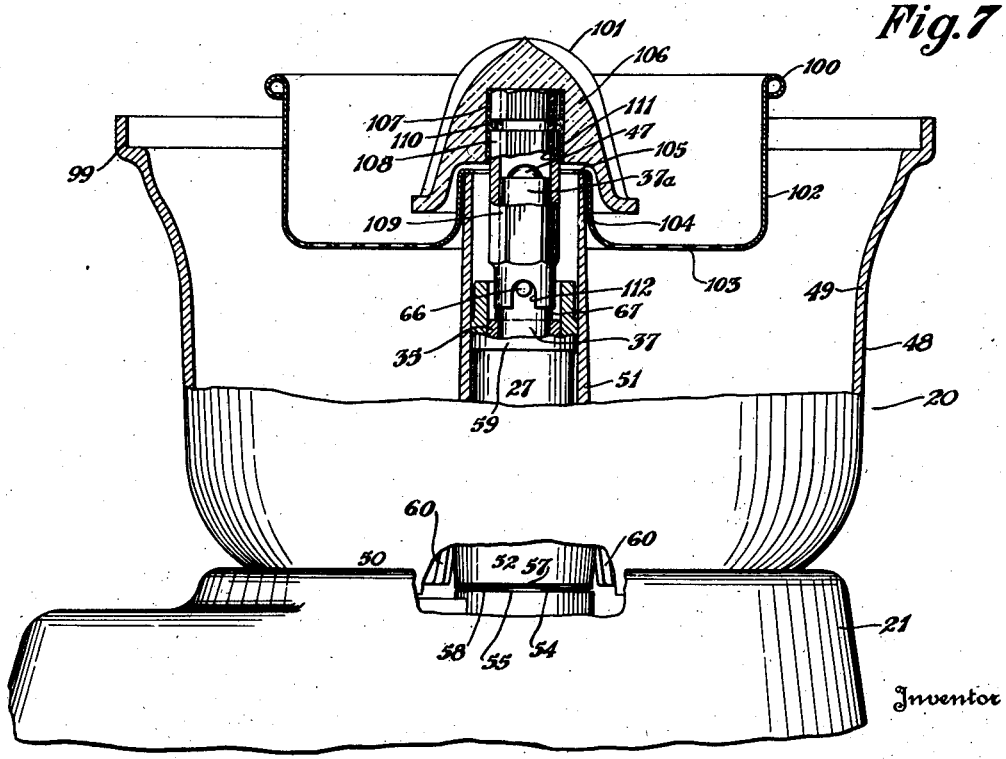
Fig. 9
Inventor
Eugene F. Martinet
By Frease and Bishop
Attorneys Dec. 8, 1936.  E. F. MARTINET  2,063,692
FOOD PREPARER
Filed Oct. 6, 1933  4 Sheets-Sheet 3
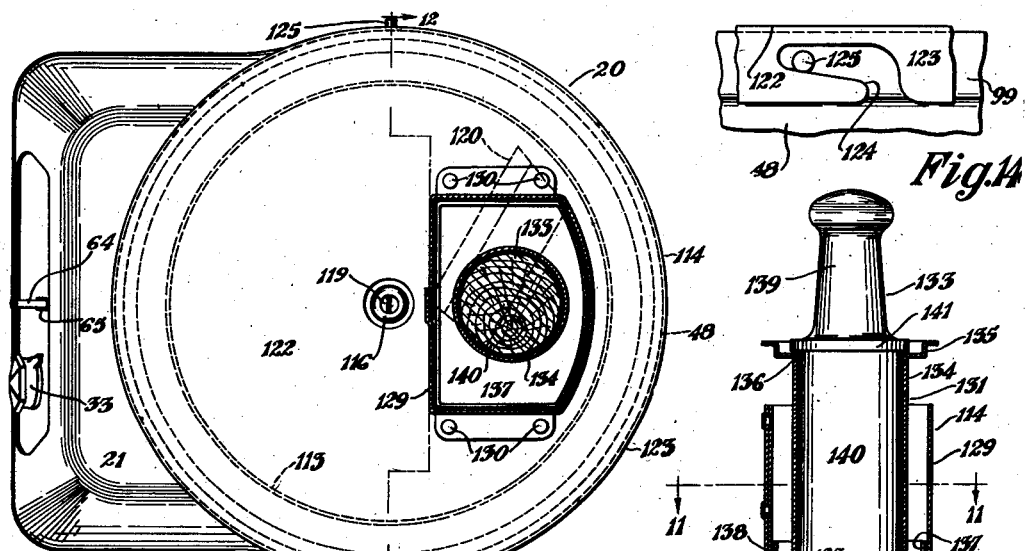
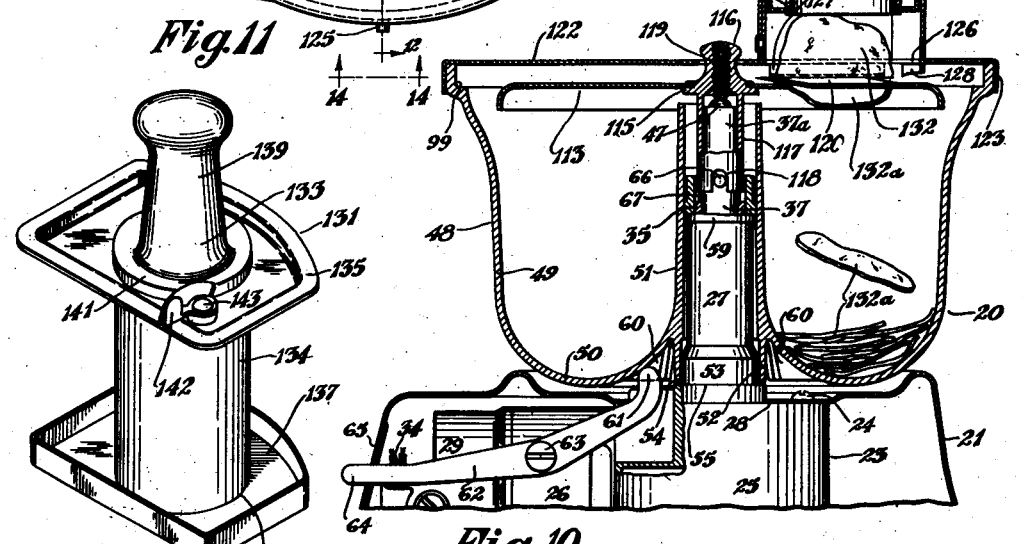
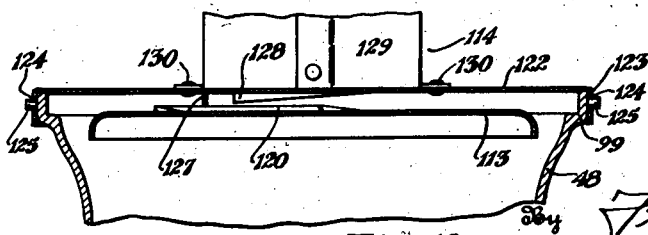
Inventor
Eugene F. Martinet
By Frease and Bishop
Attorneys

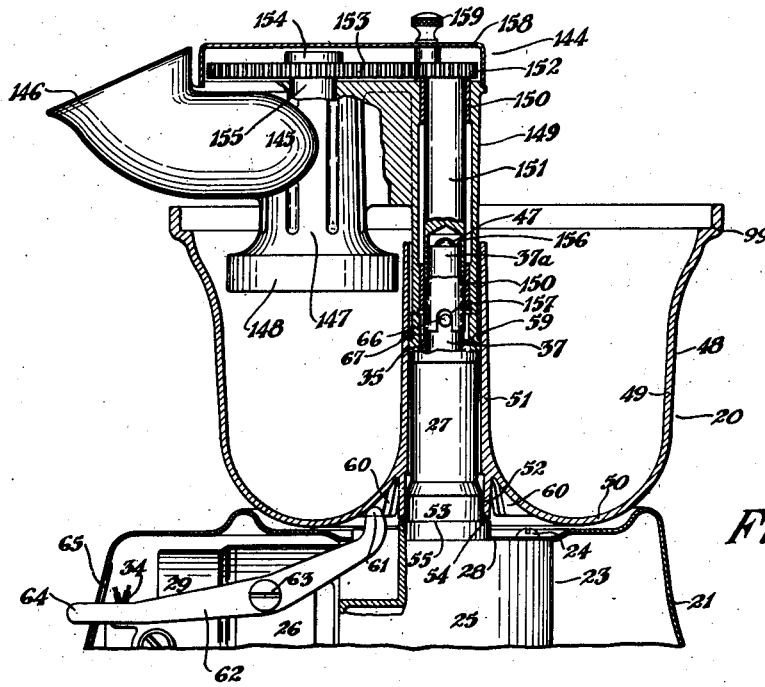
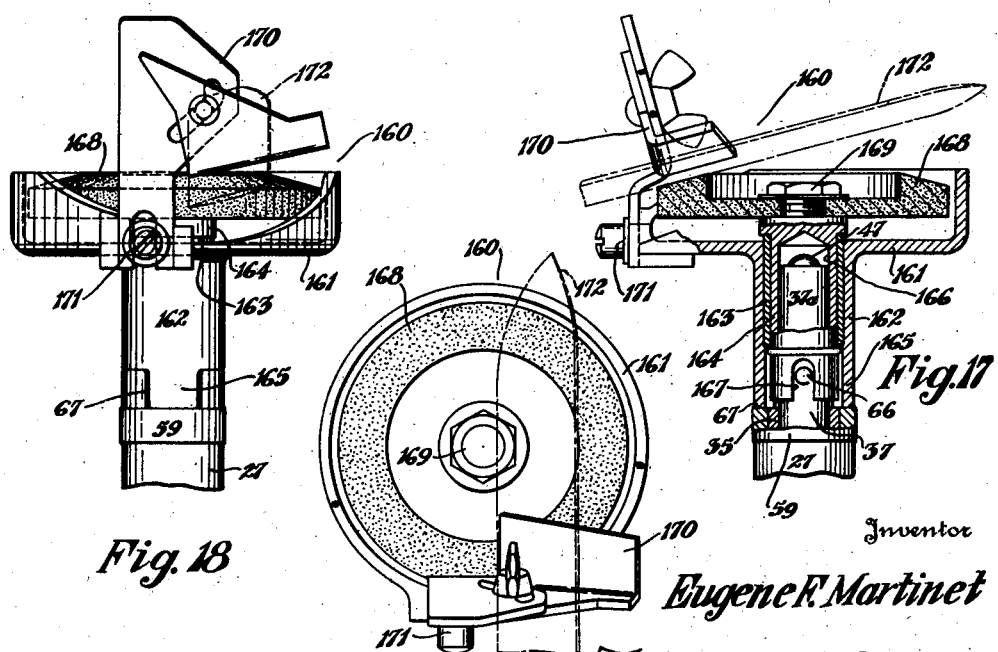

Patented Dec. 8, 1936

2,063,692

UNITED STATES PATENT OFFICE 2,063,692

FOOD PREPARER

Eugene F. Martinet, Cleveland, Ohio, assignor to The P. A. Geier Company, Cleveland, Ohio, a corporation of Ohio Application October 6, 1933, Serial No. 692,483

15 Claims. (Cl. 259—84)

The invention relates to food preparing devices or appliances for mixing, beating, whipping, juicing, straining, slicing, shredding, grinding, chopping, pureeing, and other processing of foods and foodstuffs; and more particularly the invention relates to a food preparer for such purposes of a type in which the operating mechanism therefor is housed in a base, in which a bowl is mounted on the base for receiving and processing foods and foodstuffs, and in which food preparing elements are mounted above and/or within the bowl and are detachably connected with the operating mechanism through a central tubular sleeve with which the bowl is provided.

Churns, ice cream freezers, egg beaters and mixers have been made in which mixing or beating elements operating in a bowl are driven by a drive mechanism which connects through a central tubular sleeve of the bowl. However, these prior types of devices have either been limited in use for one purpose only, or have involved the use of a planetary gear train for driving the beaters thereof; and the difficulties which have been experienced in their manufacture or use have been so numerous that they are all believed to be impractical.

It is therefore an object of the present invention to provide an improved food preparing device of the character described which avoids the difficulties which have been experienced in the manufacture, operation or use of prior devices having the same general arrangement of primary elements, and on which a large number of food processing or treating elements may be interchangeably operated almost instantaneously without the use of bolts, screws or other fastening means or special device adapters, supports, connectors, reduction gears and the like.

It is a further object of the present invention to provide an improved food preparing device in which all oil and grease for lubricating the driving mechanism thereof is at all times kept below the mixing bowl so that it is absolutely impossible for oil or grease ever to drop into or become mixed with food being prepared in the mixing bowl.

It is likewise an object of the present invention to provide an improved food preparing device which has a very low center of gravity located either within or below the mixing bowl thereof, depending upon the attachment utilized, so that the device is not top heavy and will not tip over during use.

Moreover, it is an object of the present invention to provide an improved food preparing device which is rigid, compact and simplified in construction and in which a multiple speed motor is utilized for driving various food preparing elements or attachments at proper speeds for carrying out their respective operations.

It is likewise an object of the present invention to provide an improved food preparing device in which the mixing bowl thereof may be rotated or may be held in non-rotative position, depending upon the operation being carried out therein.

It is likewise a further object of the present invention to provide a food preparing device with an improved type of beater element construction with which either mixing, beating or whipping operations may be speedily, satisfactorily and efficiently carried out.

It is likewise a further object of the present invention to provide an improved food preparing device in which the parts thereof that come in contact with food may be readily removed or detached from the remaining parts of the device for being washed and kept in a sanitary condition, and subsequently replaced, without the use of bolts, screws and the like, or the special operation of catches, locks or the like.

Similarly, it is an object of the present invention to provide an improved food preparing device in which there are no cavities, crevices, pockets and the like, where food may enter or collect, by accidental spilling of food or food ingredients, which would render the device unsanitary or which would affect the operation of the driving or driven parts or mechanism thereof.

And finally, it is an object of the present invention to provide an improved food preparing device in which safety devices are incorporated so that the operator cannot become accidentally or otherwise injured in operating the various grinding, shredding, slicing and beating attachments.

These and other objects may be obtained by the parts, elements, apparatus, devices, arrangements and combinations, preferred embodiments of which are shown in the drawings, and are hereinafter described in detail and claimed, which may be stated in general terms as including in a food preparer having a base, an integral housing mounted within the base and having a sleeve projecting vertically upwards from and through the base, a multiple speed motor operatively mounted in the housing, a shaft journalled in said sleeve, reduction gearing journalled in the housing forming an operative connection between the motor and shaft, a switch for the motor mounted in the base, a mixing bowl provided with a central tubular sleeve journalled on said housing sleeve, means for selectively holding the bowl in non-rotative position, and a food treating device detachably journalled on and preferably supported by said shaft and having a detachable clutch engagement therewith, and said food treating device preferably having a member engageable with said housing sleeve for holding parts of the device against rotation.

In the drawings,—

Figure 1 is a perspective view of the improved food preparing device with certain parts removed;

Fig. 2 is a longitudinal sectional view of the improved food preparing device shown in Fig. 1, taken on the line 2—2, Fig. 1;

Fig. 3 is a fragmentary expanded perspective view, partly in section, of certain of the drive connection parts shown in Fig. 2;

Fig. 4 is a perspective view of the improved washer bearing for the mixing bowl shown in Fig. 2;

Fig. 5 is a fragmentary view, partly in section, of certain of the parts of Fig. 2 shown in another position;

Fig. 6 is a perspective view of one of the improved beating elements;

Fig. 7 is a plan sectional view taken on the line 7—7, Fig. 5;

Fig. 8 is a sectional view of one of the bars of the improved beater taken on the line 8—8, Fig. 6;

Fig. 9 is a fragmentary elevation, with parts in section, of the improved food preparing device shown in Fig. 1 equipped with juicing and straining attachment devices;

Fig. 10 is a view similar to Figs. 2 and 9, showing the improved food preparing device equipped with slicing and safety slicing hopper attachment devices;

Fig. 11 is a plan view of the parts shown in Fig. 10 with certain parts thereof in section as on the line 11—11, Fig. 10;

Fig. 12 is an elevation section of certain of the parts shown in Figs. 10 and 11, taken on the line 12—12, Fig. 11;

Fig. 13 is a perspective view of the pusher and feeder shown in Figs. 10 and 11;

Fig. 14 is a fragmentary side elevation showing the releasable connection between the mixing bowl and safety hopper plate, looking in the direction of the arrows 14—14, Fig. 11;

Fig. 15 is an enlarged fragmentary sectional view through the knife blade of the slicing plate shown in Figs. 10, 11 and 12;

Fig. 16 is a view similar to Figs. 2, 9 and 10, showing the improved food preparing device equipped with a meat grinder;

Fig. 17 is a fragmentary sectional view of a knife sharpening attachment for the improved food preparing device;

Fig. 18 is a side elevation of the parts shown in Fig. 17; and

Fig. 19 is a plan view of the parts shown in Figs. 17 and 18.

Similar numerals refer to similar parts throughout the various figures of the drawings.

Referring more particularly to Figs. 1 to 8, inclusive, wherein the improved food preparer, together with the improved mixing, beating and whipping attachment device is shown, the food preparer generally indicated at 20 includes a base 21, preferably provided with rubber feet 22 for supporting the improved device upon a table or other convenient place of use.

A housing generally indicated at 23 is connected to the base by screws 24, and the housing 23 preferably comprises an integral casting which includes the gear case portion 25, the motor housing portion 26 and the sleeve member 27. The member 27 projects vertically upwards from the gear case portion 25 through an aperture 28 in the base 21.

The motor housing portion 26 has a motor end cap 29 attached thereto, and a multiple speed motor is mounted within the motor housing and cap 26—29, the motor shaft 30 of which is provided with worm threads 31.

The food preparing device 20 is also provided with suitable wiring 32, having a usual plug (not shown) for being attached to any suitable source of electric power; and the wiring 32 may lead to a control switch, the operating member 33 of which is shown in Fig. 1, from which switch suitable wires 34 may lead to the motor within the motor housing 26—29. The motor and switch constructions are usual constructions and therefore are not illustrated in detail.

Oilless bearings 35 and 36 are mounted within and adjacent to the extremities of the sleeve 27, and a worm gear shaft 37 is journalled in said bearings 35 and 36, the upper end 37a of which projects upward beyond the end of the sleeve 27 and the lower end 37b of which projects into the gear case portion 25 of the integral housing 23.

A preferably linen micarta worm gear 38, meshes with the worm 31 and is provided with a hub 39 and mounted by the pin 40 on the lower end 37b of the worm gear shaft 37.

The lower end 37b of the shaft 37 is also provided with an axial recess 41 in which is located a ball bearing 42 that is held in position by peening over the edge of the recess after inserting the ball therein. An adjusting screw 43, located directly below the ball 42 and axially of the shaft 37, is provided with a lock nut 44 and is threaded through the removable gear case cover 45; and the screw 43 provides means for receiving the downward axial thrust of the shaft 37 and for adjustably locating the shaft 37 in the proper position.

The gear case 25 may be filled with grease and since the bearings 35 and 36 are oilless bearings, all grease and lubricant for the motivating parts of the improved food preparer are located below the top of and within the base 21.

By providing the integral housing 23, which includes in one piece the gear case 25, the motor case 26 and the sleeve 27, the parts thus far described may be readily machined and assembled in their proper and correct relation without play between parts; and great rigidity is imparted to the motivating parts of the device. Moreover, the bearings 35 and 36 in both being rigidly mounted in the sleeve 27, may be readily located in axial alignment so that the shaft 37 driven by the motor will always run true on center.

The upper end 37a of the shaft 37 is also provided with an axial recess 46 within which is located a ball bearing 47 that is held in position by peening over the edge of the recess 46 after inserting the ball therein, for a purpose which will hereinafter be described.

A mixing bowl 48 having an outer annular wall 49, which merges into a lower toroidal shaped bottom wall 50 that terminates inwardly and upwardly in a vertically extending central tubular sleeve 51, is telescoped over the sleeve 27 as best shown in Fig. 2. The mixing bowl 48 is also provided with a downwardly extending collar 52, which is substantially in continuation of its central sleeve 51 and the collar 52 is journalled about the external circumferential bearing portion 53, of the sleeve 27, while the lower end of the collar 52 bears on a split anti-friction thrust ring 54 interposed between the collar 52 and the annular step 55 of the sleeve 27.

The split anti-friction thrust ring 54 is best shown in Fig. 4 wherein the split is indicated at 56 and the up and down corrugations 57 and 58 respectively thereof are illustrated.

When the mixing bowl 48 is telescoped over the sleeve 27, as shown in Fig. 2, the under surfaces of the down corrugations 58 of the thrust ring 54 rest on the sleeve step 55, while the lower surface of the bowl collar 52 rests on the upper surfaces of the corrugations 57 of the ring 54 (Fig. 9). The ring 54 is preferably made from strip steel, while the bowl 48 may be made of aluminum or an aluminum alloy, and the sleeve 27 may be a die cast alloy.

Thus, when the bowl 48 rotates in use, the aluminum-steel contact between the bowl and thrust ring 54 provides a noiseless anti-friction sliding contact; and the sinuous contour of the ring 54 provides sufficient springiness to compensate for variations in weight or machining of the relatively rotatable parts under thrust loads.

The sleeve 27 is also provided with an external annular upper bearing surface 59 spaced from the bearing portion 53 and above the base 21 journalling within the bowl sleeve 51, which is telescoped thereover and removably mounted thereon.

The mixing bowl 48 is preferably provided with a series of radial ribs or ears 60 extending inward from the curved bottom wall 50 toward the collar 52 for selective engagement with the inner end 61 of the bowl locking lever 62, which is pivoted at 63 to the motor housing 26, the outer operating end 64 of which projects outward through a slot 65 in the base 21, as best shown in Figs. 1 and 2 for a purpose which will be hereinafter described. With the lever 62 in the position shown in Figs. 1 and 2 of the drawings, the bowl 48 is free to rotate.

Referring more particularly to Figs. 2 and 3, the upper end 37a of the shaft 37 is provided with a diametrically disposed drive pin 66 and the upper end of the sleeve 27 is notched out at diametrically disposed places indicated at 67 for purposes which will also be hereinafter described.

The parts thus far described are in their usual positions and assembled relationship as when a food preparing operation is about to be carried out. If it is desired to carry out a mixing, beating or whipping operation in the mixing bowl 48, the improved mixing, beating and whipping attachment device generally indicated at 68 in Figs. 1 to 8, inclusive, is utilized.

The improved mixing, beating and whipping attachment device 68 preferably includes a beater holding housing 69 having a cover 70, and the housing 69 is preferably provided with an integral central downwardly projecting tubular sleeve 71 within which is pressed a tubular oilless bearing 72.

A beater drive gear 73 is located within the housing 69 in which no lubricant is used, by journalling the tubular hub 74 thereof within the bearing 72; and the lower end 74a of the tubular or cylindrical sleeve or hub 74 is provided with slightly helical notches 75 while the lower end of the beater housing sleeve 71 is provided with diametrically disposed downwardly projecting ears 76.

Moreover, the inner diameter of the sleeve hub 74 is preferably the same as the outer diameter of the upper end 37a of the shaft 37 so that the sleeve hub may be telescoped thereover; and an axially movable adjusting screw 77 is threaded through a boss 78 in the beater holder cover 70 for resting upon the ball 47 when the beater holder is telescoped over the end 37a of the shaft 37, with the notches 75 thereof engaging the outer ends of the pin 66 and with the ears 76 of the sleeve 71 engaged in the notches 67 of the sleeve 27.

The beater holder housing 69 is also provided with a plurality of diametrically disposed openings 79, and opposite the openings 79 axially thereof are located bosses 80 in which pins 81 provided with annular recesses 82 (Figs. 5 and 7) are fixed. The pins 81 provide means for releasably mounting the improved beaters generally indicated at 83, and best shown in Fig. 6, upon the beater holder.

Each beater 83 preferably comprises an integral preferably die casting, including a gear portion 84, a shaft portion 85, a collar portion 86 interposed between the gear and shaft portions, and beater bars 87 extending outwardly from the shaft portion 85, thence downwardly and inwardly to a meeting point 88.

The gear, shaft and collar portions 84—85—86 are provided with a tubular bore 89 for releasably telescoping the beaters 83 over the beater holder pins 81 (Figs. 2, 5 and 7).

Each beater 83 is provided with a small circumferential groove 90 between the gear portion 84 and flange portion 86 thereof; and the groove 90 may preferably be discontinuous as at 91 for a purpose to be presently described.

Each beater 83 is also provided with a radial opening 92 which is shouldered at 93 and leads from the groove 90 to the bore 89 thereof; and a shouldered pin 94 having a preferably rounded inner end 95 is slidably mounted within the opening 92 and held therein by a split wire ring 96, so that when the beater 83 is mounted on the beater holder pin 81, the inner rounded end 95 of the shouldered pin 94 engages in the groove 82 of the pin 81 to normally hold the beater in position.

However, if the beater 83 is grasped by one hand, and the holder 69 is grasped by the other, an axial pull on the beater 83 is sufficient to cause the shouldered pin 94 to move outward in the hole 92 against the pressure of the spring 96, so that the beater 83 may be removed from its mounting pin 81 for being washed.

The beater bars 87 are preferably substantially triangular in shape, as best shown in Fig. 8, for a purpose which will be hereinafter described; the outer surfaces 87a being preferably arcuate surfaces terminating preferably in flat corners 87b from which the flat surfaces 87c extend angularly inward to the sharp corner 87d.

When the improved beating, mixing and whipping device 68 is assembled in operative relation in the improved food preparer, a cover or splash ring 97 may be provided for the mixing bowl 48, by telescoping the outer annular edge portion 98 of the cover 97 within the upper shouldered periphery 99 of the mixing bowl 48.

The improved juicing and straining attachments for the improved food preparer 20 are generally shown in Fig. 9 and include the juice strainer 100 and the juice reamer or extractor 101. The juice strainer 100 preferably includes an annular side wall 102, a perforated bottom wall 103, and an inner tubular sleeve 104 extending upwards from the bottom wall 103 and terminating in an inturned annular flange 105.

The juice extractor 101 preferably includes a preferably porcelain reamer 106 provided with an internal socket 107 in which the head 108 of the reamer shaft 109 is cemented at 110. The shaft 109 is provided with an internal bore 111 arranged to fit over or telescope the upper end 37a of the shaft 37; and the lower end of the shaft 109 is preferably provided with diametrically disposed notches 112 by means of which a driving engagement between the shaft 37 and the shaft 109 is established when the notches 112 engage the outer ends of the drive pin 66.

The improved slicing and shredding attachments are shown in Figs. 10 to 15, inclusive, and include the cutter plate 113 and the combined cover and safety feeder generally indicated at 114. The cutter plate 113 is provided with a central hub 115 having a handle portion 116 and a sleeve portion 117, which may be telescoped over the upper end 37a of the shaft 37 with its diametrically disposed notches 118 in engagement with the ends of the drive pin 66. The handle portion 116 of the hub 115 is preferably internally threaded for receiving an axially movable adjusting screw 119, the lower end of which rests on the ball 47 when the slicing plate is positioned on the end 37a of the shaft 37. Thus, the screw 119 provides means for adjusting the position of the plate 113 relative to the other parts of the device.

As shown in Figs. 10, 11, 12 and 15, the slicing plate 113 is provided with a blade 120 struck up from the plate, it being understood that a plurality of different slicing plates may be supplied with the improved food preparer, each having different blade openings 121 for slicing different thicknesses of materials, or having a plurality of notch blades for shredding rather than slicing.

The combined cover and safety feeder 114 utilized when operating slicing or shredding plates, includes a cover plate 122 preferably provided with a downturned peripheral flange 123 for telescoping over the upper end portion 99 of the mixing bowl 48; and the flange 123 is preferably provided with diametrically disposed bayonet locking slots 124 (Fig. 14) for locking engagement with lugs 125 provided on the upper end 99 of the bowl 48, whereby the cover plate and safety feeder attachment may be secured and locked to the mixing bowl.

The cover plate 122 also is preferably provided with an opening 126, one portion of which may terminate in a downturned stop bar 127 and another portion of which may terminate in a safety cam 128, for purposes which will be hereinafter described. A hopper 129 is secured to the plate 122, as by riveting at 130, extending upwardly from the opening 126, and a feeder generally indicated at 131 may be inserted into the hopper 129 for pressing a vegetable 132 or the like, against the cutter plate 113 so that rotation of the plate 113 cuts slices 132a from the vegetable 132.

The feeder 131 preferably comprises an inner member 133 and an outer member; and the outer member preferably includes a feeder tube 134, an upper plate 135 secured at 136 to the upper end of the tube 134, and a lower plate 137 secured at 138 to the lower end of the tube 134.

The inner feeder member 133 is preferably a wooden bat having a handle portion 139, a tubular portion 140 with a flange 141 therebetween; and upon inserting the tubular portion 140 within the outer feeder tube 134, the inner and outer feeder members may be locked together by a finger actuated lock 142 mounted at 143 on the plate 135 and engaging the flange 141 of the inner feeder member 133.

The improved meat grinder or chopper is generally indicated at 144 in Fig. 16 and includes a grinder body 145 having the usual hopper inlet 146 and extrusion portion 147 with the squeezer head 148. Cast integrally with the grinder body 145 is a sleeve portion 149 within which is provided bearings 150 in which is journalled a sleeve shaft 151.

The upper end of the shaft 151 is provided with a spur gear 152 that meshes with the gear 153 mounted at 154 upon the end of the grinder screw shaft 155. The lower end of the sleeve 151 is provided with an internal bore 156 which telescopes over the upper end 37a of the shaft 37, diametrically disposed notches 157 being provided in the lower end of the sleeve 151 for engagement with the ends of the drive pin 66.

The lower end of the outer sleeve 149 is also provided with lugs similar to the lugs 76, for being received in the notches 67 of the sleeve 27, to hold the meat grinder body 145 against rotation. The gears 152 and 153 are preferably enclosed by a cover plate 158 held in place by a thumb screw 159, which may also be utilized as a handle for positioning the improved meat grinder or chopper 144 in place on the improved food preparer.

The food preparer may also be equipped with a knife sharpener or grinder generally indicated at 160 in Figs. 17, 18 and 19; and the improved grinder 160 may comprise a shell 161 having a sleeve portion 162 projecting therefrom within which is mounted a bearing 163 journalling the abrasive wheel shaft 164. The sleeve 162 is preferably provided with lugs 165 that fit into the notches 67 of the sleeve 27, while the shaft 164 is provided with an internal bore 166 for telescoping over the upper end 37a of the shaft 37, the lower end of the shaft 164 being provided with diametrically disposed notches 167 by means of which a driving engagement is established with the outer ends of the drive pin 66.

An abrasive wheel 168 is mounted at 169 on the upper end of the shaft 164 and an adjustable guard rest 170 is mounted at 171 on the grinder body 161; so that the blade of a knife 172, indicated in dot-dash lines, may be drawn across the rotating abrasive wheel 168 for sharpening the knife edge thereof.

In the operation and use of the improved food preparer 20, the mixing bowl 48 is first telescoped over the drive shaft sleeve 27. For mixing, beating or whipping, the beaters 83 are telescoped over their stub shafts or pins 81 and the beater holder 68 is then telescoped over the upper end 37a of the drive shaft 37, when the sleeve lugs 76 engage in the notches 67 to maintain the beater holder 68 against rotation, and the notches 75 engage the clutch pin 66 for transmitting driving motion from the shaft 37 through the sleeve hub 74, the gears 73 and 84 to the beaters 83. Materials to be mixed are then placed in the bowl and a cover 97 positioned as shown in Fig. 2, whereupon the switch lever 33 may be moved to the desired speed for operating the beaters.

When a mixing, beating or whipping operation is being carried out, the bowl 48 is permitted to rotate, that is, the locking lever 62 is not utilized. Because the outer contour of the beaters 83 closely follows the inner contour of the mixing bowl 48, as shown particularly in Fig. 2, very small amounts of material may be mixed, beaten or whipped in the mixing bowl 48; and practically every particle of the material must come in contact with the beaters as they revolve, the beating of the material causing the bowl to revolve.

I have discovered that the peculiar more or less triangular shape of the beater bars 87 enables one style of beater 83 to be used for either a mixing or a beating, or a whipping operation; as distinguished from other types of mixing elements which require different types of beaters for carrying out a mixing or a beating or a whipping operation.

Moreover, the cast integral construction of the beaters 83 renders the beaters rigid so that they hold their shape and closely follow the contour of the bowl. Thus, the beater elements 83 have a longer life and may be more readily kept clean than prior types of beater elements which have been made of sheet metal.

Moreover, the flanges 86 on the beaters 83 provide guard means for preventing food particles from being thrown upward into or entering the gear compartment for the drive gears 73 and 84; and the improved releasable lock for the beaters, best shown in Figs. 5 and 7, provide an efficient means for locking the beaters 83 in operative position, but permitting their removal from the beater holder for being washed without the manual operation of any catches, thumb screws or the like.

The adjusting screw 73 is provided for supporting the entire weight of the beater holder 68 and beaters 83 driven thereby upon the drive shaft 37, so that the beater holder is maintained in position independently of the clutch parts 66 and 75 and driven independently of the mixing bowl 48. The screw 77 is originally adjusted by the manufacturer so as to bring the lower contour of the beaters 83 closely adjacent to the lower bowl wall 50, whereby very small amounts of material may be satisfactorily mixed, beaten or whipped. As wear of the parts may occur due to long continued or hard use, the position of the adjusting screw 77 may be changed to properly position the beaters 83 with respect to the mixing bowl 48 without releasing engagement between the clutch parts 66 and 75.

In utilizing the improved juicing and straining attachments, the bowl 48 is positioned on the improved food preparer 20 as shown in Fig. 9, the strainer 100 is then positioned over the upper end of the bowl sleeve 51, and the juice reamer 101 is telescoped over the upper end 37a of the drive shaft 37, as shown in Fig. 9. The motor is then started and fruit is pressed firmly against the reamer whereby the juice therefrom passes through the strainer and into the mixing bowl 48. As is the case with the improved beater attachment, the load of the juice reamer 101 and of the fruit pressed thereagainst is carried directly by the drive shaft 37 independently of any of the other parts of the device.

In operating the improved slicing, shredding and safety feeding attachments, the mixing bowl 48 is positioned on the device 20 as before, the bowl is locked against rotation by moving the lever 62 to the position shown in Fig. 10 of the drawings and the desired slicing or shredding plate 113 is then mounted on the upper end 37a of the drive shaft 37. The cover plate 122 is then locked to the bowl as shown in Figs. 10, 11, 12 and 14; and is thereby held stationary. Cabbage, potatoes, and the like, may then be introduced into the hopper 129, and the feeder 131 pressed against the same so that a slicing or shredding occurs upon rotation of the shaft 37.

If smaller vegetables are to be sliced or shredded, such as carrots, cucumbers and the like, the outer feeder will be positioned within the hopper, the lock 142 released, and the vegetable introduced to the rotating knife blade through the feeder tube 134 by pressing the same downward with the inner feeder 133.

The bar 127 serves as a cutter bar against which the material to be sliced or shredded is pressed during a cutting operation; and the adjusting screw 119 is provided for each cutter or shredder plate so that the location of the knife blade 120 may be brought closely adjacent to the lower edge of the cutter bar 127, it being pointed out that the entire load imposed by the cutter plate and a cutting operation is carried directly by the upper end 37a of the shaft 37, which drives the cutter plate.

The improved safety cam 128 is provided so that if the cutter plate is adjusted at too high a position, or if the plate is not properly positioned, the knife blade will first ride along the cam 128 and will miss the cutter bar 127, but will cause the cover 122 and the bowl 48 to which it is locked to be raised.

In operating the meat grinder, the bowl 48 is positioned as aforesaid and the meat grinder or chopper 144 is positioned as shown in Fig. 16 with its sleeve shaft 151 telescoped over and in driving engagement with the upper end 37a of the shaft 37 whereby operation of the shaft drives the grinder shaft 155 to chop or grind meat or food and extrude the same through the squeezer head 148 into the mixing bowl. The mixing bowl may be locked or free to rotate as desired, while the entire load of the food grinder is carried directly by the sleeve 27.

In operating the improved knife grinder, the sleeve 164 thereof is telescoped over the upper end 37a of the drive shaft 37 whereby rotation of the shaft 37 rotates the abrasive wheel 168. When operating the improved knife sharpener or grinder, it is probably undesirable to have the mixing bowl in position thereunder.

Accordingly, the improved food preparer provides for the convenient, ready and easy attachment of various and sundry food preparing devices for carrying out mixing, beating, whipping, juicing, straining, slicing, shredding, grinding, and chopping operations and other processing of food and foodstuffs by merely telescoping the sleeve of the particular processing device or attachment over the drive shaft of the improved food preparer, which drive shaft in most cases carries the entire weight of or load of the attachment and of the operation carried out thereby, without the use of extra parts or the adjustment or fastening of screws or bolts.

Moreover, each and all of the rotary attachments are supported by or operated independently of the bowl, and the driving connections are covered by the upper end of the bowl sleeve which is located above the driving clutch parts; the improved safety feeder not being rotated but being held against rotation by locking the same to the bowl and locking the bowl.

In addition, because the upper end 37a of the shaft 37 projects above the upper end of the sleeve 27, any food material which may be spilled into the bowl sleeve 51 during use of the food preparer, may be readily removed and all parts cleaned upon removal of the mixing bowl for washing.

And finally, the improved food preparer and all of the parts and attachments thereof are compact, rigid and simplified in construction so that they may be kept clean and sanitary; the entire device has a very low center of gravity regardless of the attachment utilized and therefore is not being subject to being tipped over; all oil and grease is at all times kept below the mixing bowl so that it is impossible to introduce the same into the food being prepared; and the improved food preparer has an attractive and distinctive appearance.

I claim:—

1. In a food preparing device, a base, driving mechanism mounted within said base and including a tubular housing sleeve projecting vertically upwards from said base and a drive shaft journalled in said sleeve, a mixing bowl having a central tubular sleeve rotatably mounted on and removably telescoped over said housing sleeve, said housing sleeve being provided with an annular step below the lower end of said mixing bowl sleeve, and a corrugated ring washer interposed between said housing step and the lower end of said mixing bowl sleeve to form a bearing for the bowl sleeve.

2. In a food preparing device, a base, driving mechanism mounted within said base and including a tubular housing sleeve projecting vertically upwards from said base and a drive shaft journalled in said sleeve, a mixing bowl provided with a central tubular sleeve rotatably mounted on and removably telescoped over said housing sleeve, said housing sleeve being provided with an annular step below the lower end of said mixing bowl sleeve, and a corrugated resilient split ring washer interposed between said housing step and the lower end of said mixing bowl sleeve to form a bearing for the bowl sleeve.

3. In a food preparing device, a base, driving mechanism mounted within said base and including a sleeve projecting vertically upwards from the base, a drive shaft journalled in said sleeve, a mixing bowl having a central tubular sleeve removably telescoped over and rotatably mounted on said housing sleeve, stop means on the lower wall of said bowl adjacent to said bowl sleeve, and adjustable locking means mounted on said housing for selective engagement with said stop means for holding the bowl in non-rotative position.

4. In a food preparing device, a base, driving mechanism mounted within said base and including a sleeve projecting vertically upwards from the base, a drive shaft journalled in said sleeve, a mixing bowl having a central tubular sleeve telescoped over and rotatably mounted on said housing sleeve, radial ears on the lower wall of said bowl adjacent to said bowl sleeve, and a locking lever pivotally mounted on said housing for selective engagement with said bowl ears for holding the bowl in non-rotative position.

5. In a food preparing device, a base, driving mechanism mounted within said base and including a tubular sleeve projecting vertically upwards from said base, a drive shaft journalled in said sleeve, the upper end of said drive shaft projecting above the upper end of said sleeve and being provided with a clutch part, a ball mounted in the upper end of said shaft axially thereof, a food processing attachment having a driven sleeve removably telescoped over said shaft end, said driven sleeve having a clutch part for releasable engagement with said shaft clutch part, and an adjustable member mounted on said attachment axially of its sleeve and resting on said ball, for supporting the load of said attachment directly on said shaft independently of said clutch parts and for adjusting the position of said attachment axially of said shaft.

6. In a food preparing device, a base, driving mechanism mounted within said base and including a tubular sleeve projecting vertically upwards from said base, a drive shaft journalled in said sleeve, the upper end of said drive shaft projecting above the upper end of said sleeve and being provided with a clutch part, a food processing attachment having a housing provided with a sleeve, a driven sleeve in said housing sleeve, said driven sleeve being removably telescoped over said shaft end and having a clutch part for releasable engagement with said shaft clutch part, and the tubular sleeve and said attachment housing sleeve having interengaging parts holding said attachment housing against rotation when the attachment driven sleeve is rotated by said drive shaft.

7. In a food preparing device, a base, driving mechanism mounted within said base and including a tubular sleeve projecting vertically upwards from said base, a drive shaft journalled in said sleeve, the upper end of said drive shaft projecting above the upper end of said sleeve and being provided with a clutch part, a mixing bowl having a central tubular sleeve telescoped over said first mentioned sleeve, a food processing attachment having a housing provided with a sleeve, a driven sleeve in said housing sleeve, said driven sleeve having a clutch part for releasable engagement with said shaft clutch part, and said attachment housing and driven sleeves being removably telescoped over said shaft end and within said mixing bowl sleeve, and the first mentioned sleeve and said housing sleeve having interengaging parts holding said attachment housing against rotation when the attachment driven sleeve is rotated by said drive shaft.

8. In a food preparing device, a base, driving mechanism mounted within said base and including a tubular sleeve projecting vertically upwards from said base, a drive shaft journalled in said sleeve, the upper end of said drive shaft projecting above the upper end of said sleeve and being provided with a clutch part, a mixing bowl having a central tubular sleeve telescoped over said first mentioned sleeve, a beating attachment having a housing provided with a sleeve, a driven sleeve in said housing sleeve, said driven sleeve having a clutch part for releasable engagement with said shaft clutch part, said attachment housing and driven sleeves being removably telescoped over said shaft end and within said mixing bowl sleeve, the first mentioned sleeve and said housing sleeve having interengaging parts holding said attachment housing against rotation, a gear mounted in said attachment housing on said driven sleeve, a pin carried by said attachment housing, and a beater element releasably rotatably journalled on said pin and having a pinion in operative engagement with said gear.

9. In a food preparing device, a base, driving mechanism mounted within said base and including a tubular sleeve projecting vertically upwards from said base, a drive shaft journalled in said sleeve, the upper end of said drive shaft projecting above the upper end of said sleeve and being provided with a clutch part, a ball mounted in the upper end of said shaft axially thereof, a mixing bowl having a central tubular sleeve telescoped over said first mentioned sleeve, a beating attachment having a housing provided with a sleeve, a driven sleeve in said housing sleeve, said driven sleeve having a clutch part for releasable engagement with said shaft clutch part, said attachment housing and driven sleeves being removably telescoped over said shaft end and within said mixing bowl sleeve, the first mentioned sleeve and said housing sleeve having interengaging parts holding said attachment housing against rotation, a gear mounted in said attachment housing on said driven sleeve, a pin carried by said attachment housing, a beater element releasably rotatably journalled on said pin and having a pinion in operative engagement with said gear, and an adjustable member mounted in said housing axially of its sleeve and resting on said ball.

10. In a beater attachment construction for a food preparing device, a beater holder, a driven gear rotatably mounted in said beater holder, a pin mounted on said holder having an annular groove therein, a beater element journalled on said pin provided with a pinion operatively engaging said gear, and said beater element being provided with a spring pressed plunger releasably engaging said groove for releasably holding said beater element journalled on said pin in operative position, whereby the beater element may be removed from the holder by pulling the beater element axially of the pin.

11. In a beater attachment construction for a food preparing device, a beater holder, a driven gear rotatably mounted in said beater holder, there being an opening in said beater holder, a pin mounted on said holder axially of said opening, a beater element journalled on said pin and provided with a pinion introduced through said opening into said holder for operatively engaging said gear, a flange on said beater element covering said opening, and said beater element being provided with means releasably engaging said pin for releasably holding said beater element journalled on said pin in operative position, whereby the beater element may be removed from the holder by pulling the beater element axially of the pin.

12. In a food preparing device, a base, an integral housing mounted within the base; said base being provided with an opening; said housing including a motor housing portion, a gear housing portion, and a sleeve portion projecting vertically upwards from the gear housing portion through said opening; bearings rigidly fixed within the ends of said sleeve; a drive shaft journaled in said bearings; adjustable thrust transmitting means interposed between the shaft and housing; said housing sleeve being provided with external spaced circumferential bearing portions above said base; a mixing bowl having a central tubular sleeve rotatably journaled on said circumferential bearing portions and removably telescoped over said housing sleeve; said housing sleeve being provided with an annular step below the lower end of said mixing bowl sleeve; and anti-friction means interposed between said housing step and the lower end of said mixing bowl sleeve.

13. In a food preparing device, a base, driving mechanism mounted within said base and including a tubular sleeve projecting vertically upwards from said base, a drive shaft journaled in said sleeve, the upper end of said drive shaft projecting above the upper end of said sleeve and being provided with a clutch part, a food processing attachment having a driven sleeve removably telescoped over said shaft end, said driven sleeve having a clutch part for releasable engagement with said shaft clutch part, adjustable means acting between said attachment and said shaft for supporting the load of said attachment directly on said shaft independently over said clutch parts and for adjusting the position of said attachment axially of said shaft, and said adjustable means being operable without releasing engagement between said clutch parts.

14. In a beater attachment construction for a food preparing device, a beater holder, a driven gear rotatably mounted in said beater holder, a pin mounted on said holder having an annular groove therein, a beater element journaled on said pin provided with a pinion operatively engaging said gear, a plunger carried by said beater element, and a resilient split wire ring pressing said plunger into releasable engagement with said groove for releasably holding said beater element journaled on said pin in operative position.

15. In a beater attachment construction for a food preparing device, a beater holder, a driven gear rotatably mounted in said beater holder, there being an opening in said beater holder, a pin mounted on said holder axially of said opening, a beater element journaled on said pin and provided with a pinion introduced through said opening into said holder for operatively engaging said gear, and said beater element being provided with means releasably engaging said pin for releasably holding said beater element journaled on said pin in operative position, whereby the beater element may be removed from the holder by pulling the beater element axially of the pin.

EUGENE F. MARTINET.